(12) United States Patent
Merz et al.

(10) Patent No.: US 8,215,168 B2
(45) Date of Patent: Jul. 10, 2012

(54) MICROMECHANICAL INERTIAL SENSOR FOR MEASURING ROTATION RATES

(75) Inventors: Peter Merz, Beldorf (DE); Manfred Weiss, Itzehoe (DE)

(73) Assignee: Fraunhofer-Gesellschaft zur Förderung der angewandten Forschung e. V., München (DE)

( * ) Notice: Subject to any disclaimer, the term of this patent is extended or adjusted under 35 U.S.C. 154(b) by 417 days.

(21) Appl. No.: 12/594,597

(22) PCT Filed: Mar. 20, 2008

(86) PCT No.: PCT/EP2008/053409
§ 371 (c)(1),
(2), (4) Date: Nov. 12, 2009

(87) PCT Pub. No.: WO2008/122502
PCT Pub. Date: Oct. 16, 2008

(65) Prior Publication Data
US 2010/0083756 A1    Apr. 8, 2010

(30) Foreign Application Priority Data
Apr. 5, 2007 (DE) .......................... 10 2007 017 209

(51) Int. Cl.
*G01C 19/00* (2006.01)
(52) U.S. Cl. ................ 73/504.02; 73/504.12; 73/514.38
(58) Field of Classification Search .............. 73/504.12, 73/488, 493, 494, 496, 504.02, 510, 514.02, 73/514.38
See application file for complete search history.

(56) References Cited

U.S. PATENT DOCUMENTS

| 4,598,585 A | 7/1986 | Boxenhorn |
| 5,203,208 A | 4/1993 | Bernstein |
| 5,345,824 A * | 9/1994 | Sherman et al. .......... 73/514.18 |
| 5,488,862 A | 2/1996 | Neukermans et al. |
| 5,535,902 A | 7/1996 | Greiff |
| 5,560,568 A | 10/1996 | Schmittle |
| 5,635,640 A | 6/1997 | Geen |
| 5,650,568 A | 7/1997 | Greiff et al. |

(Continued)

FOREIGN PATENT DOCUMENTS

EP    0906557 B1    4/1999

(Continued)

*Primary Examiner* — Hezron E Williams
*Assistant Examiner* — Samir M Shah
(74) *Attorney, Agent, or Firm* — Gudrun E. Huckett

(57) ABSTRACT

A rotation rate sensor for sensing a rotation $\Omega$ by which the sensor is rotated has a substrate and a driving and sensing arrangement located substantially flat in an X-Y plane above a substrate surface of the substrate and having a center. The driving and sensing arrangement has a drive mass and a sense mass that are arranged at different spacings from the center of the driving and sensing arrangement symmetrically about the center. The oscillation modes of the drive mass and the sense mass are partially transmittable onto one another and are partially decoupled. The rotation $\Omega$ is sensed in that a tilting of the sense mass out of a surface plane of the driving and sensing arrangement is sensed. A first one of the drive and sense masses that has a greater spacing to the center is tilted under the effect of Coriolis force out of the surface plane. The first one of the drive and sense masses is connected by symmetrically arranged external anchors to the substrate such that a restoring action for the tilting action of the first one of the drive and sense masses is assisted by the external anchors.

26 Claims, 5 Drawing Sheets

U.S. PATENT DOCUMENTS

| | | | |
|---|---|---|---|
| 5,751,154 A * | 5/1998 | Tsugai | 324/661 |
| 5,894,091 A * | 4/1999 | Kubota | 73/504.12 |
| 5,895,850 A | 4/1999 | Buestgens | |
| 5,955,668 A * | 9/1999 | Hsu et al. | 73/504.12 |
| 5,974,880 A * | 11/1999 | Yamaguchi et al. | 73/514.32 |
| 6,062,082 A | 5/2000 | Guenther et al. | |
| 6,151,966 A * | 11/2000 | Sakai et al. | 73/514.32 |
| 6,250,157 B1 | 6/2001 | Touge | |
| 6,278,283 B1 * | 8/2001 | Tsugai | 324/678 |
| 6,349,597 B1 * | 2/2002 | Folkmer et al. | 73/504.02 |
| 6,504,385 B2 * | 1/2003 | Hartwell et al. | 324/662 |
| 6,505,511 B1 | 1/2003 | Geen et al. | |
| 6,845,669 B2 * | 1/2005 | Acar et al. | 73/504.14 |
| 6,907,782 B2 | 6/2005 | Lentner et al. | |
| 6,928,872 B2 * | 8/2005 | Durante et al. | 73/504.04 |
| 6,997,054 B2 * | 2/2006 | Tsugai | 73/504.12 |
| 7,237,316 B2 * | 7/2007 | Sakamoto | 29/595 |
| 7,395,721 B2 * | 7/2008 | Taniguchi | 73/780 |
| 7,418,864 B2 * | 9/2008 | Asami et al. | 73/514.32 |
| 7,600,428 B2 * | 10/2009 | Robert et al. | 73/514.32 |
| 7,907,838 B2 * | 3/2011 | Nasiri et al. | 396/55 |
| 7,934,423 B2 * | 5/2011 | Nasiri et al. | 73/514.02 |
| 8,047,075 B2 * | 11/2011 | Nasiri et al. | 73/514.32 |
| 8,069,726 B2 * | 12/2011 | Seeger et al. | 73/504.12 |
| 8,096,181 B2 * | 1/2012 | Fukumoto | 73/504.12 |
| 8,113,054 B2 * | 2/2012 | Je et al. | 73/514.32 |
| 2003/0154788 A1 | 8/2003 | Willig et al. | |
| 2003/0216884 A1 | 11/2003 | Cardarelli | |
| 2004/0149035 A1 | 8/2004 | Acar et al. | |

FOREIGN PATENT DOCUMENTS

| | | |
|---|---|---|
| EP | 1309834 B1 | 4/2007 |
| WO | 02/16871 | 2/2002 |

* cited by examiner

MICROMECHANICAL INERTIAL SENSOR FOR MEASURING ROTATION RATES

BACKGROUND OF THE INVENTION

The present invention concerns an oscillation rotation rate sensor that is excited in an x-y plane and comprises an external anchor means so that the degrees of freedom of the oscillation of a mass that is positioned relatively far outwardly is limited in a defined way. This provides advantages such as an increased shock robustness or also a reduced adhesion tendency relative to the substrate surface.

Among the multitude of concepts of micromechanical (MEMS) rotation rate sensor o structures, in particular the mechanically decoupled oscillation sensors are very effective and exhibit a high signal/noise ratio. They are based on the principle that the Coriolis force energy from one oscillation mode, the primary oscillation, is injected into the second oscillation mode, the secondary oscillation. The amplitude of the secondary oscillation is proportional to the rotation rate and can therefore be evaluated capacitively, for example.

Rotation rate sensors measure the rotation speed of a body. They are therefore used anywhere where the measurement of inertial movements such as acceleration and rotation rate are required:

| | |
|---|---|
| automobile industry | navigation, driver assistance systems, ESP, rollover detection |
| aviation industry | navigation |
| military applications | navigation |
| robotics | measuring; controlling |
| biomedicine | sensing of motion sequences |
| life science | navigation, sensing of motion sequences |

Rotation rate sensors utilize as a measuring principally usually the effect of Sagnac interference (interference of light beams in a rolled glass fiber) or the Coriolis force in the form of a gyro or a moved spring-mass system. In particular the latter can be greatly miniaturized by manufacturing methods of micro-electro mechanical system technology (MEMS) and thus can be produced more efficiently and less costly.

In FIG. 3 the operating principle of rotary oscillation gyroscopes is illustrated. FIG. 3A shows schematically the function of a rotary oscillation gyroscope. A mass (sense+drive mass, i.e., an oscillating mass that, under the effect of the Coriolis force, moves simultaneously out of the oscillation plane) is attached by a spring to an anchoring point. This spring is construction-technologically designed such that its movement is reduced to 2 degrees of freedom:

- a rotation movement about the Z axis (drive axis, drive mode) with spring constant $k_{\Phi Z}$
- a rotation movement about the Y axis (sense axis, sense mode) with spring constant $k_{\Phi Y}$ The rotation rate about the X axis is measured.

The oscillation mass is caused to carry out a resonant movement so that an oscillating velocity vector or an oscillating moment of inertia is impressed. Accordingly, the sensor concepts are grouped into OMV (oscillating momentum vector) and OVV (oscillating velocity vector). A Coriolis force that is acting thereon causes a corresponding orthogonal deflection movement of the oscillating mass (coupled) and can thus be detected.

In a mechanically decoupled oscillation rotation rate sensor (FIG. 3B) a mass (drive mass) is excited in the primary oscillation with two degrees of freedom. This rotation rate sensor comprises accordingly a first mass arranged in an x-y plane (also referred to as primary oscillator, drive mass or drive element,) that is excited to perform an oscillating vibration and a second mass that is used for sensing (also referred to as secondary oscillator, sense mass or sense element) that is connected by connecting members (springs) with the first mass. The Coriolis force that is induced by an impressed rotation rate leads to a deflection in the second degree of freedom. Decoupling can be effected in different ways. In the first variant, the Coriolis force will act, when for example a rotary movement Ω of the sensor occurs about an axis perpendicular to the oscillation axis, on the mass points of the body that is undergoing rotary oscillation; by suitable measures this force is transmitted onto the sense mass. Its deflection in this dimension is then detected by suitable means, for example, capacitive electrodes. In this connection, coupling between the two masses or elements is ideally such that the rotary oscillation is not transmitted onto the second mass of the second element (sense mass). This can be realized in that this mass is suspended such that it has only a single degree of freedom of movement. In the second variant, the rotary movement of the first mass is transmitted onto the second mass so that the Coriolis force acts on the mass points of both bodies, wherein the first mass however is suspended such that it cannot be tilted or deflected out of the x-y plane.

The first variant has the advantage that the detection of deflection and thus of the rotation rate can be measured with the drive rotation having only little effect. Since the primary movement in drive mode is not detected or only partially detected, the useful signal has a higher signal-to-noise ratio. However, it is still disadvantageous in this connection that the drive element upon action of a rotation rate is tilted out of the x-y plane; this deteriorates the drive performance. In the second variant, these advantages and disadvantages are switched.

In all variants, the two oscillation modes can be in principle translation or rotation movements. The present invention concerns also rotation rate sensors whose active drive is realized by translation or rotation, with rotatory systems being preferred. Rotatory systems are in general less sensitive with regard to translatory shock injection and oscillation injection.

Since the principles for both systems are the same (see, for example, DE 196 41 284 C1), the basic principles and their embodiment upon which the present invention is based will be discussed in the following only with the aid of rotatory systems wherein however it is to be understood that translatory systems are encompassed also by the invention.

In case of rotation rate sensors and especially MEMS sensors there are a plurality of system approaches and, accordingly, there are many publications and patent applications. In the following table some important publications are listed that are based on the principle of the oscillation gyroscope. The columns are also indicate the input and output axes. The axis to be sensed is defined as the input axis. The drive axis results from the movement direction of the primary mode or drive mode which can be either a translatory (trans) or a rotatory (rot) periodic movement. The sense axis in general is positioned perpendicularly to the rotation axis and to the drive axis. The axis identifiers X, Y, and Z refer to a sensor of planar configuration wherein X and Y are positioned within the sensor plane and Z is perpendicular to this component plane.

TABLE 1

| patent | input type | axis (sensing) | drive axis | sense axis | decoupled |
|---|---|---|---|---|---|
| U.S. Pat. No. 4,598,585 | OMV | Z | Y rot | X rot | no |
| U.S. Pat. No. 5,203,208 | OMV | Z | Y rot | X rot | no |
| U.S. Pat. No. 5,535,902 | OVV | X | Z rot | Y rot | no |
| U.S. Pat. No. 5,650,568 | OVV | X | Z rot | Y rot | no |
| U.S. Pat. No. 5,635,640 | OVV | X | Z rot | Y rot | no |
| U.S. Pat. No. 6,505,511 | OVV | Z | X trans | Y trans | yes |
| U.S. Pat. No. 5,895,850 | OMV | Z | X trans | Y trans | yes |
|  |  | X | Y trans | Z trans |  |
| U.S. Pat. No. 6,062,082 | OVV | X | Z rot | X rot | no |
| EP0906557 | OVV | X | Z rot | Y rot | yes |
| WO02/16871 | OVV | Z | X trans | Y trans | yes |
| U.S. Pat. No. 5,955,668 | OVV | X | Z rot | Y rot | yes |

Two of the publications listed in the above table concern rotatory mechanically decoupled rotation rate sensors with oscillation of the excitation element in x-y plane and deflection of the detection element about the y axis. In this connection, the two different variants that have already been discussed above in principle are realized. In EP 0906557 B1 a rotation rate sensor with decoupled orthogonal primary and secondary oscillations is disclosed. The primary oscillator is attached by means of a primary oscillator suspension centrally on the substrate and secures by means of torsion springs a secondary oscillator located in the same plane and provided as a sensing element, wherein the torsion springs transmit the induced oscillation of the primary oscillator rigidly onto the secondary oscillator. For one rotation of the sensor about a plane that is perpendicular to the plane in which the two oscillation elements are located, the Coriolis force acts on both elements. While the secondary oscillator is thereby caused to be tilted out of its plane, the primary oscillator remains in its plane because, on the one hand, it is anchored on the substrate in such a way that tilting out of this plane is not easily possible and, on the other hand, the torsion springs prevent a retransfer of the Coriolis force acting on the secondary oscillator onto the primary oscillator.

The proposal according to U.S. Pat. No. 5,955,668 is based on the reverse approach. The oscillation element that is excited to perform a radial oscillation is arranged in an annular shape about the tiltable sensor element that is attached by means of two anchors to the substrate. Flexible springs connect the oscillation element with the sensor element and are designed such that they neither transmit the oscillation of the oscillation element onto the sensor element nor retransmit the tilting movement of the sensor element caused by Coriolis force onto the oscillation element.

In FIG. 4, the principal configuration of a rotatory mechanically decoupled rotation rate sensor according to the second variant is illustrated schematically. A movable mass element (8) (sense mass) is suspended centrally on an anchoring point (12) by means of a spring structure (10). By means of a second spring structure (11) a further mass element (9) (drive mass) is connected fixedly to (8). The mass element (9) is excited to perform a periodic movement about the z axis.

The dimensions are constructively designed such that
1. the mass element 9 is substantially provided with two degrees of freedom of movement:
   a rotatory movement about an axis that is parallel to the Z axis or even about the Z axis itself with a velocity vector $v_{Z2}$
   a rotatory movement about an axis that is parallel to the Y axis or about the Y axis itself with a velocity field $v_{y2}$
2. the mass element 8 in the ideal case has only one degree of freedom, that is a rotational movement about the Y axis with a velocity field $v_{y1}$.

When the velocity vector $V_{Z1}$ of the mass 8 is equal to or almost zero, this is referred to as a mechanically decoupled system relative to this rotatory degree of freedom. A movement of the mass 9 about the Z axis does not transmit movement energy onto the mass 8 in this situation.

In operation, the mass element 9 is now caused to perform a periodic oscillation about a parallel line that is parallel to the Z axis at frequency $f_x$ and maximum velocity amplitude $v_{Z2}$ (primary oscillation, primary mode). When the oscillation system is rotated about the sensitive axis X with a rotation rate $\omega_x$, onto the moved mass 9 a pseudo force, the Coriolis force, is acting that is defined by the following equation:

$$\vec{F}_{Cor.} = 2 * m_2 * (\vec{\omega} \times \vec{V}_{Z2}(t))$$

with
$F_{Cor.}$ Coriolis force
$m_2$ mass of the primary oscillator 2
$\omega_x$ externally impressed rotation rate
$V_{Z2}$ speed or velocity of the primary mass.

Accordingly, an oscillating force field perpendicular to the X-Y plane is generated which causes a deflection of the mass (9) out of the plane. The Z deflection (secondary mode) is transmitted by means of spring element 11 onto the mass element 8. The magnitude of deflection of the mass element 9 can be used therefore directly for determining the rotation rate.

The excitation of a micro-electro mechanical structure can be effected, for example, in the following way: electrostatically, for example, by applying voltage onto finger electrodes, piezoelectrically or magnetically by injecting a magnetic field.

The measurement of a deflection can be realized in many ways, for example, capacitively by means of electrodes with reference space, difference-capacitively by means of paired spaced electrodes, electrostatically by means of electrodes with reference space, piezoelectrically, piezoresistively or optically.

Most rotation rate sensor systems are based on capacitive measurement of the deflection of the sense mass. The latter is in general embodied as a thin plate in the X-Y plane. In FIG. 6 it is schematically illustrated how the rotation rate sensors according to the invention, in section along the X-Z or the Y-Z axis, may be configured and how they can be manufactured. The illustrated configuration is particularly beneficial because it is comprised of only a few components and enables an integral configuration of anchor, oscillation element, connecting elements (springs) and detection elements: a substrate, for example, a silicon wafer, is covered with a structured sacrificial layer, for example, with an oxide that can be dissolved by a suitable etching agent or solvent. On top, a layer that can be structured and is made of a material such as polysilicon is applied from which the oscillation element, the anchoring structure, the connecting elements, and the sensing elements are to be formed (FIG. 6*a*). The layer that can be structured is connected directly to the substrate at the location of the future anchor. It can be structured exclusively twodimensionally, for example, by suitable measures such as exposure to light through an aperture mask and subsequent dissolving of the unexposed and non-crosslinked surfaces (FIG. 6a). Subsequently, the sacrificial layer is dissolved and removed.

The capacitive measurement can be done most precisely when a differential capacity is measured, see FIG. 5 showing a substrate 13 with applied counter electrodes (measuring electrodes) A and B (14 and 15) as well as the plate 16 that upon rotational movement of the sensor about an axis X is tilted in Y direction (in this Figure the paper plane is the Z-Y plane).

In an ideal manufacturing process in the rest position the resulting differential capacity $\Delta C$ is zero. In reality, a pre-tilting of movable parts out of the horizontal rest position is often observed. This can be caused, for example, by anisotropic material properties. Examples for this are the presence of micro-crystallites in polysilicon layers, anisotropic layer stress, thermal layer stress or similar effects.

By means of the capacity difference in the useful signal an offset value is injected in the evaluation electronics. Since corresponding amplifier stages therefore must have a higher dynamic, a pre-tilting leads to reduced resolution of the sensor system. Current MEMS sensor systems can resolve for a band width of 25 Hz a rotation rate of 0.1°/s.

The rotation rate of 0.1°/s typically leads to an oscillation about the Y axis with the amplitude of $8 \times 10^{-7}$ degrees for the mass 9 and of $4 \times 10^{-7}$ degrees for the mass 9, see FIG. 4. This corresponds to a capacity change of 3 aF for the mass 8. The basic capacity is 3 pF; it is therefore necessary to resolve capacity changes in the ppm range.

On the other hand, either during manufacture or during the course of the service life of the sensor element a contact between movable sensor elements and/or stationary elements may occur. In an unfavorable case, when the restoring force is too small, by means of numerous adhesion forces the deflection is partially or permanently maintained so that the sensor is no longer functional and remains adhered ("sticking"). A mechanical shock or oscillation effect can also cause an intimate contact of movable sensor elements so that they jam or stick. In particular, the outer sensor structures that are far removed from an anchoring point have as a result of lever action a higher adhesion tendency. By increasing the restoring forces, for example, by springs of greater width, the movable structure can be constructed to be more stiff. However this causes also the useful signal to be reduced because the Coriolis force leads to a reduced plate deflection and thus to a reduced sensitivity.

It is an object of the present invention to provide rotation rate sensors of the aforementioned kind in which the sensitivity remains satisfactory but the robustness relative to parasitic environmental effects is improved in order to obtain a good balance between these parameters that affect one another mutually.

SUMMARY OF THE INVENTION

This object is solved by providing a rotation rate sensor for sensing a rotation $\Omega$ by which the sensor is rotated wherein the sensor comprises a substrate and a driving and sensing arrangement that is located substantially flat above the substrate surface wherein the driving and sensing arrangement comprises a drive mass and a sense mass that are arranged at different spacings relative to a center of the sensing arrangement symmetrically about this center and whose oscillation modes can be partially transmitted onto one another and partially are decoupled, wherein the rotation $\Omega$ is sensed in that tilting of the sense mass out of the surface plane of the driving and sensing arrangement is sensed, characterized in that that one of the two masses that has a greater spacing to said center can be tilted out of said surface plane under the effect of Coriolis force and is connected to the substrate by means of a connecting means in such a way that the restoring action of said tilting action is assisted by the connecting means.

In some of these embodiments the driving and sensing arrangement, as in the prior art, is suspended from an anchor above the substrate. In other embodiments, the employed connecting means according to the invention by means of which the external mass is connected to the substrate can take over the suspension or securing function for the driving and sensing arrangement completely so that an internal anchor or an internal anchor structure, that otherwise assumes this function at least partially, is no longer needed. This will be explained in the following in more detail.

Further preferred embodiments of the invention result from the dependent claims.

According to the present invention, especially preferred is a rotation rate sensor for sensing a rotation $\Omega$ about which the sensor is rotated that comprises a substrate and a driving and sensing arrangement that is located substantially in X-Y direction flat above the substrate surface, wherein the driving and sensing arrangement may be, but must not be, connected by an anchor to the substrate, and comprises
 (i) a drive mass that by excitation can be caused to perform a translatory oscillation in the Y direction or a rotatory oscillation about a Z axis, as well as
 (ii) a sense mass that is tilted out of the X-Y plane about Y axis upon action onto the rotation rate sensor of a rotation $\Omega$ that occurs about an X axis,
wherein the drive mass and the sense mass are arranged mirror-symmetrical and/or rotation-symmetrical about a center of the driving and sensing arrangement and, if a central anchor is present, are arranged about this anchor and one of the aforementioned masses is positioned at a greater spacing to the center than the other one of said masses,
wherein connecting elements are present that either:
(a) in case the sense mass has a greater spacing to the center than the drive mass, transmit the oscillation of the drive element in X-Y plane onto the sensing element but prevent that the drive element, upon action of rotation $\Omega$ onto the sensor, can be tilted out of the X-Y plane or reduce this tilting action, or
(b) in case the drive mass is positioned at a greater spacing to the center than the sensing mass, allow tilting of the drive element upon action of the rotation $\Omega$ onto the sensor, but prevent or reduce a transmission of the oscillation of the drive element in X-Y plane onto the sensing element,
characterized in that one of the said masses that has a greater spacing to the center is connected by at least two connecting means to the substrate in such a way that the restoring action for the tilting action out of the X-Y plane is assisted by the connecting means.

By assisting the restoring action the tilting action is reduced in the rotation rate sensors according to the invention, and this is achieved to various degrees, for example, by approximately 15 to 60%, depending on the configuration.

Preferably, the oscillation element or elements perform/s a rotatory oscillation.

DESCRIPTION OF PREFERRED EMBODIMENTS

In the following, the invention will be explained in connection with FIGS. 1 and 2 in more detail.

Figure 1:
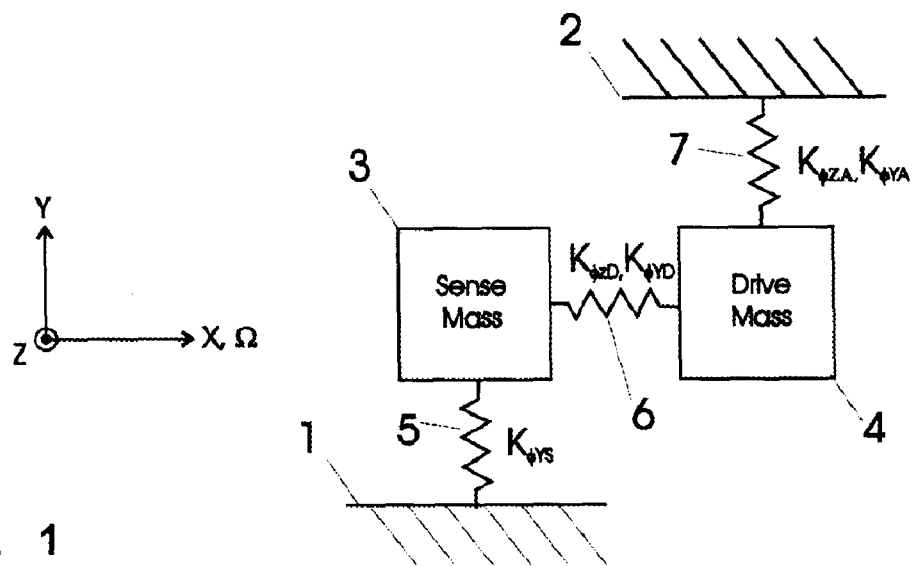
FIG. 1 shows schematically a decoupled rotation rate sensor with external springs.

FIG. 1 shows a principal schematic of a mechanically decoupled rotation rate sensor with external springs, in particular according to variant (b) of the above preferred embodiment of the present invention and a the central anchor. A sense mass 3 is attached by an anchoring spring element (5) to a central anchoring point 1. By means of the configuration of the spring the sensing element has a degree of freedom, here a rotation out of the X-Y plane with the spring constant $k_{\Phi YS}$ correlated with the spring element 5. The drive mass 4 is connected with one end by the transfer spring element 6 to the sense mass 3. The spring element has the two rotatory degrees of freedom $k_{\Phi ZD}$ and $k_{\Phi YD}$. In addition, the drive element is connected by external spring element 7 to the anchoring point 2.

In sensing operation the drive element or the drive mass is caused to perform an oscillating movement about the Z axis. Based on the spring constants $k_{\Phi ZD}$ and $k_{\Phi ZA}$ of the spring elements 6 and 7 as well as the moments of inertia, this movement is defined with respect to resonance frequency and amplitude as follows:

$$f_D = \sqrt{\frac{k_{\Phi ZD} + k_{\Phi ZA}}{I_{ZZ}}}$$

with
$f_D$ resonant frequency of the primary oscillation (drive)
$k_{\Phi ZD}$ spring constant of the drive spring (element 6)
$k_{\Phi ZA}$ spring constant of the drive spring (element 7)
$I_{ZZ}$ mass moment of inertia about the Z axis.

The acting Coriolis force causes a deflection out of the plane as a result of the velocity vector field of 4. This movement is defined by the spring constants $k_{\Phi YD}$ and $k_{\Phi YA}$ as well as the moments of inertia of 4.

$$f_S = \sqrt{\frac{k_{\Phi YD} + k_{\Phi YA}}{I_{YY}}}$$

with
$f_s$ resonant frequency of the secondary oscillation (sense)
$k_{\Phi YD}$ spring constant of the drive spring (element 6)
$k_{\Phi YA}$ spring constant of the external spring (element 7)
$I_{YY}$ mass moment of inertia about the Y axis.

By means of the transfer spring 6 the movement of the drive element is partially transmitted onto the sensing element wherein the magnitude of this transmission is determined by the properties of the transfer spring. The sense mass follows as a result of the limited degree of freedom only the movement induced by the Coriolis force. Ideally, it is decoupled from the mode of the drive mass, i.e., it cannot follow its oscillating primary movement. This can be effected in that the spring 6 is not limited with respect to the corresponding degrees of freedom and/or in that the suspension 5 on the substrate is rigid relative to the torsion movements about the Z axis or the flexing movements out of the Z axis.

A reduction of the degrees of freedom of the springs can be achieved by constructive configuration of the spring element. The lateral degrees of freedom become almost zero by selecting a flexible spring. Moreover, with a suitable selection of the geometric size of the flexible spring (length, width, height) anisotropic spring constants can be generated. Finally, rotatory degrees of freedom can be limited by a constructive arrangement of several flexible springs to a spring element so that only one rotatory movement direction is possible. Such arrangements are known to a person skilled in the art.

Figure 2:
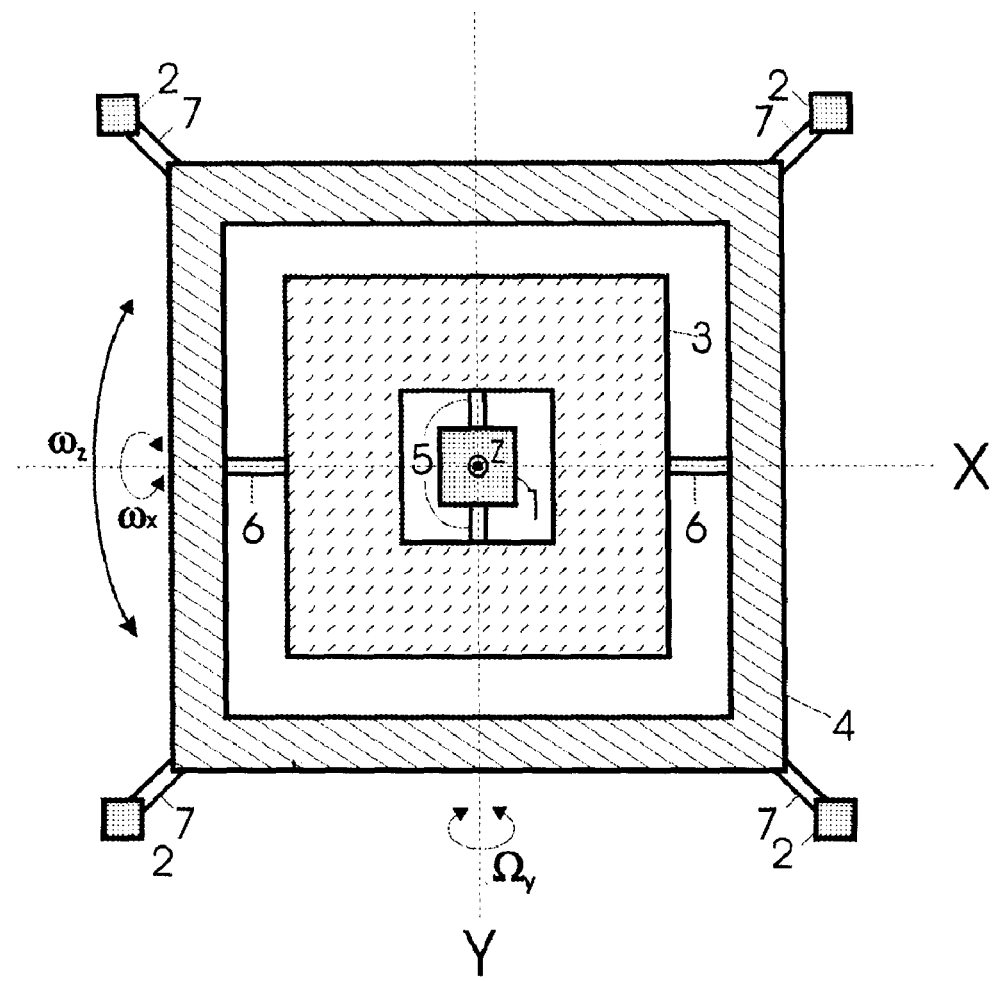
FIG. 2 shows a concrete embodiment of the principal arrangement illustrated in FIG. 1 of a decoupled rotation rate sensor.
Figure 3:
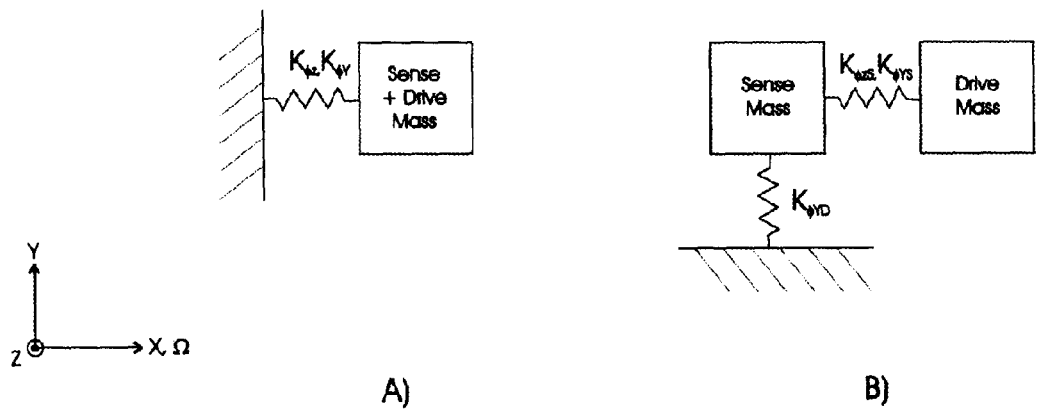
FIG. 3 illustrates the operating principle of rotary oscillation gyroscopes.
Figure 4:
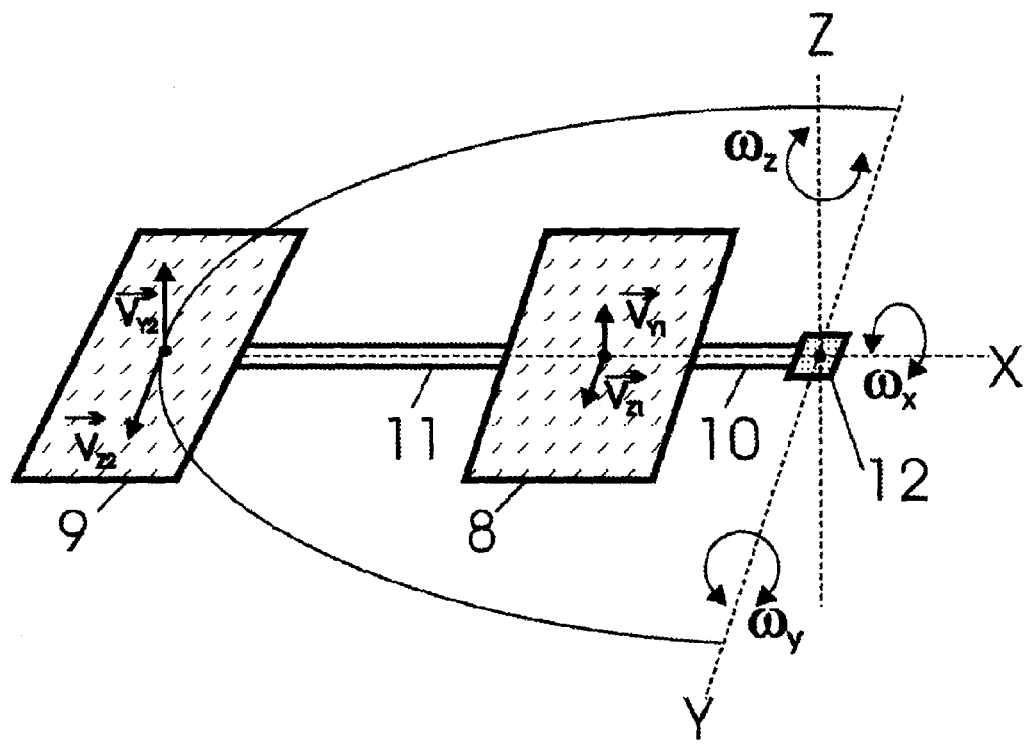
FIG. 4 illustrates the principal configuration of a rotatory mechanically decoupled rotation rate sensor according to the second variant.
Figure 5:
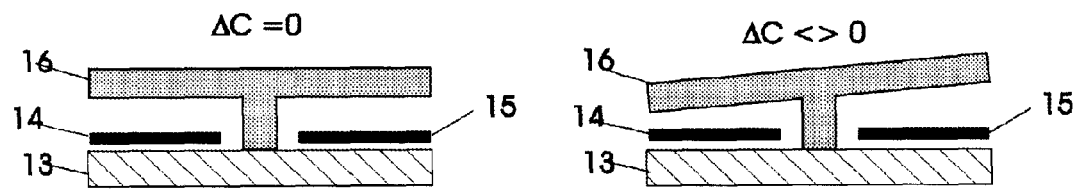
FIG. 5 shows a substrate with applied counter electrodes (measuring electrodes) as well as a plate that upon rotational movement of the sensor about an axis X is tilted in Y direction (in this Figure the paper plane is the Z-Y plane).
Figure 6:
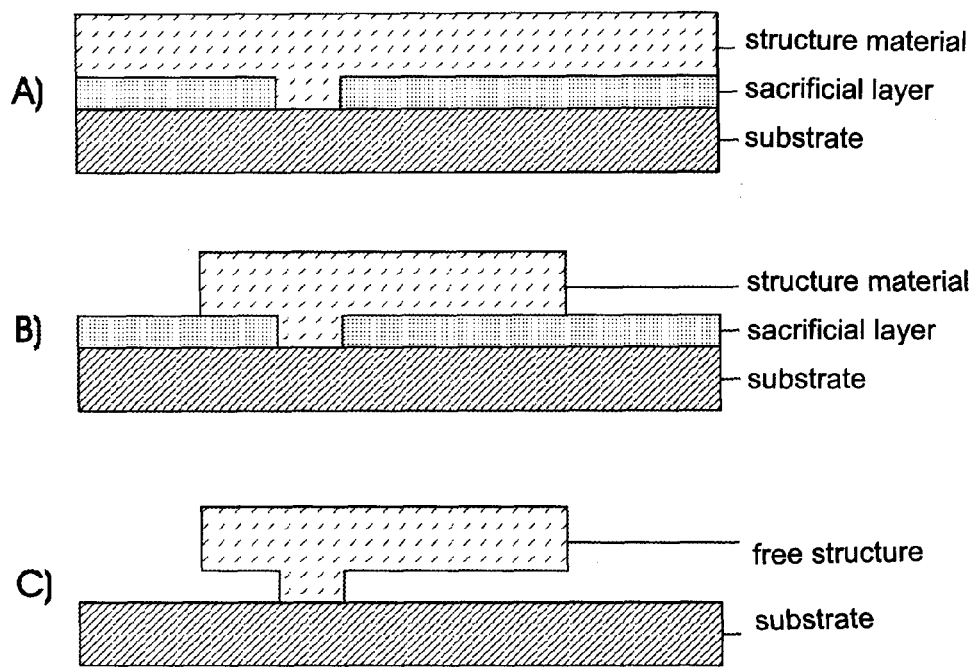
FIG. 6 illustrates how the rotation rate sensors according to the invention, in section along the X-Z or the Y-Z axis, may be configured and how they can be manufactured

In FIG. 2 a concrete embodiment of the principal arrangement illustrated in FIG. 1 of a decoupled rotation rate sensor is shown schematically. It should be understood that the spatial dimensions and geometries are actually selectable at will.

An internal mass 3 is attached by spring structures 5 centrally on an anchoring point 1. An external mass structure 4 is connected by spring structures 6 to the internal mass 3. In addition, on the external mass 4 spring structures 7 are mounted. They connect the mass with externally positioned fixed anchoring points 2. The entire self-supporting sensor structure is thus attached to the central anchoring point as well as to the peripheral external anchoring points. The external springs increase the restoring forces at the critical external areas and compensate process inhomogeneities. In this way, the above mentioned problems can be minimized significantly.

In principle, the restoring forces as a whole should be selected so as not to be too great because the sensitivity of the sensor would then be limited. The present invention makes allowance for this problem in that the restoring force represented by the spring 6 between drive mode and sense mode is separated spatially and constructively relative to the spring element 7 that determines the restoring forces for reducing the adhesion tendencies.

The spring 6 ensures a transfer of the moment of the sensing movement onto the internal part of the driving and sensing arrangement. The spatial arrangement of this spring element has no functional relation to the radial spacing from the anchoring point and can be selected at will.

The externally positioned springs cause an increased stiffness of the primary mode in the sensing direction so that, in accordance with this, the transfer function of spring 7 must be adjusted. Since the springs 7 are however positioned at a maximum radial spacing to the anchoring point (central herein), the large lever action achieves a high restoring moment. The springs should be designed preferably such that the primary mode is not significantly damped. This can be achieved, for example, by selecting spring constants as defined in the dependent claims.

In a special very beneficial embodiment of the invention the spring elements 5, 7 and 6 have the following properties:

| spring element | function | $k_\phi$ [$10^{-6}$ Nm/rad] | $k_{\phi Y}$ [$10^{-6}$ Nm/rad] | $k_{\phi Z}$ [$10^{-6}$ Nm/rad] |
|---|---|---|---|---|
| 5 | central anchoring spring | 28 | 11 $k_{\phi YZ}$ | 420 $k_{\phi ZZ}$ |
| 6 | transfer springs drive-sense | 25 | 20 $k_{\phi YD}$ | 16 $k_{\phi ZD}$ |
| 7 | external spring restoring spring | 3.8 | 4.5 $k_{\phi YA}$ | 1.6 $k_{\phi ZA}$ |

The symmetrically arranged external anchors correct tilting and pull the movable structure into a horizontal rest position. Thus, process-caused inhomogeneities and process fluctuations can be compensated. This leads to an improved useful signal and thus a better linearity, less noise and reduced zero signal.

Moreover, the tendency to stick after a shock or as a result of oscillation action are eliminated or greatly reduced because the restoring forces of the external anchors have their points of attack in the vicinity of the impact locations and therefore prevent sticking thereat. Moreover, the failure sensitivity in case of shock or oscillation action is significantly reduced so that a smaller false signal is output.

In the embodiment that is described and illustrated herein the reduction of tilting is approximately 30%.

The effect according to the invention leads to a significant advantage of this sensor type relative to other systems. In particular, the high demands in the automobile industry require a continuously increasing robustness relative to environmental effects such as shock and oscillation.

It should also be understood that the above configuration is only one of many with which the present invention can be realized. For example, the drive mass and/or the sense mass can be also comprised, instead of being a single mass (that in the afore described embodiment is frame-shaped), of a plurality of mass elements. The individual elements of the drive mass may be connected to one another; they may also be separately driven, respectively, and each connected with one or several elements of the sense mass, respectively. wherein the connecting members must fulfill the same requirements as disclosed above in connection with the connecting elements and anchoring elements. The same holds true mutatis mutandis for the sense mass also.

Instead of the above explained configuration it is also possible to connect the drive mass to the internal anchoring structure, for example, a central anchor, and to connect the sense mass to the external anchoring structure (i.e., by the aforementioned connecting means).

By the way, as a result of the connecting means according to the invention it is not necessary to have an internal anchoring structure; in particular, it must not be comprised of a central anchor as in the afore described embodiment. This holds true in particular for those embodiments in which the sense mass is positioned farther inwardly and the drive mass is positioned father outwardly. In this respect, the following should be noted:

The purpose of the suspension of the sense mass in the interior from an anchor, aside from the mechanical attachment, is primarily the generation of a restoring moment. The drive oscillation is partially already significantly decoupled by means of the connecting elements (6), i.e., the inner mass does not follow the annular oscillation or follows it only minimally. In spite of this, a restoring moment should act on the internal mass so that even the partially transmitted and thus reduced force moment of the annular oscillation is suppressed or compensated.

This restoring moment can be generated in various ways. In the afore described embodiment this is realized by a central suspension from an anchor connected to the substrate. However, other methods can be realized. Some special examples for this will be disclosed in the following.

Figure 7:
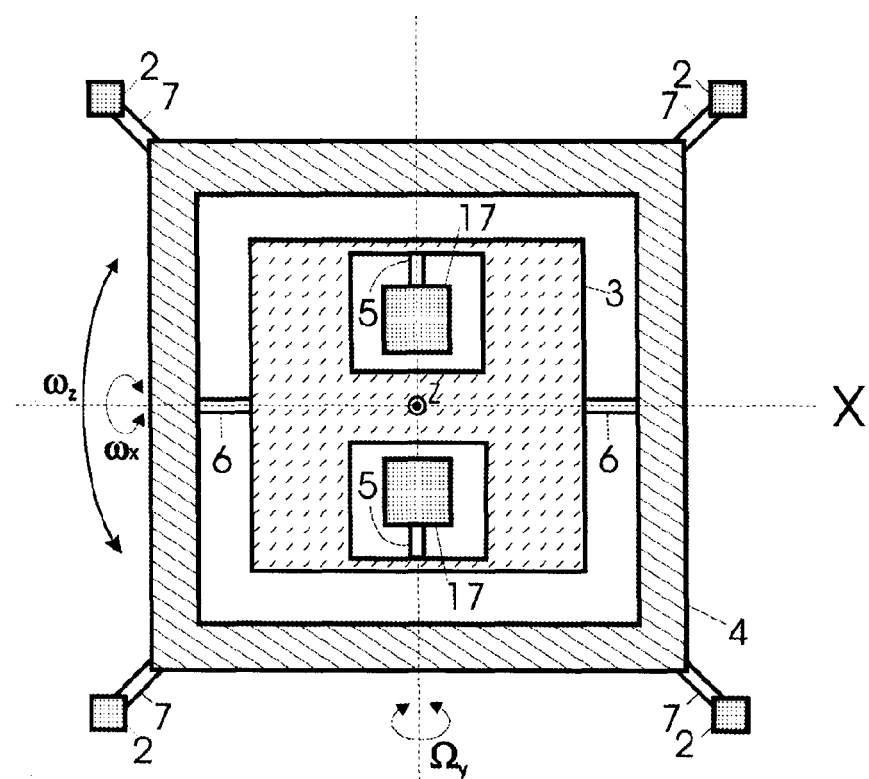
FIG. 7 shows a mirror-symmetrical but not central anchoring of the sense mass.

FIG. 7 shows an embodiment with a mirror-symmetrical but not central anchoring of the sense mass wherein same parts are identified with same reference numerals. In this embodiment, anchoring is realized by anchoring means embodied by points 17 which points are positioned on the central Y axis. With respect to the X axis this anchoring structure is also mirror-symmetrical.

Figure 8:
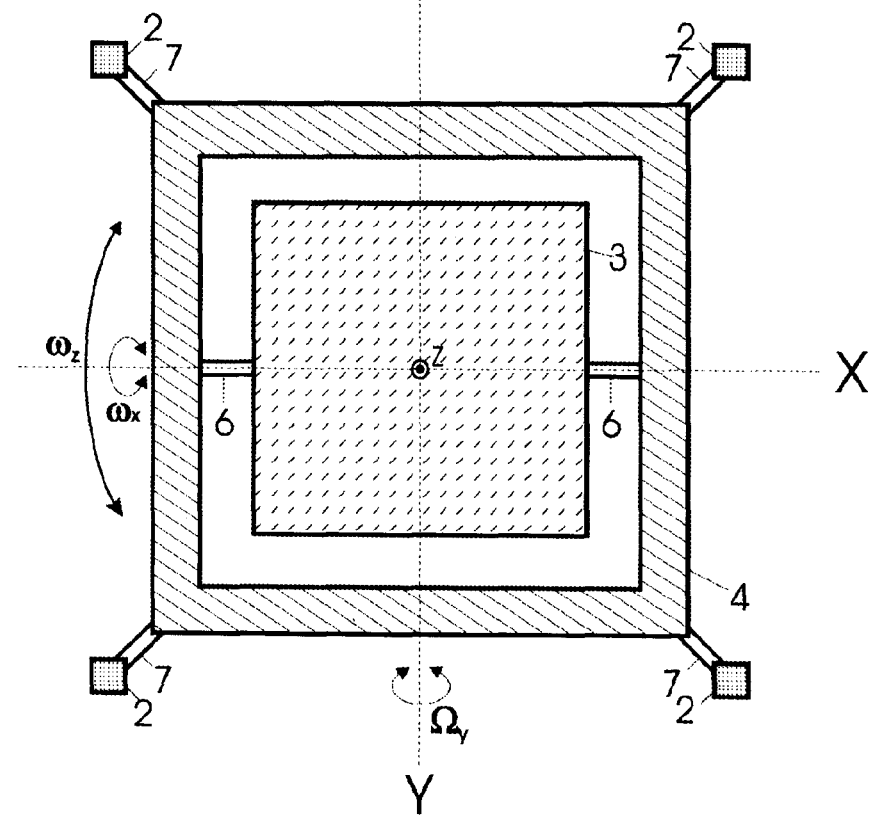
FIG. 8 shows the internal mass suspended exclusively by external connecting means and the restoring moment being effected by the mass inertia of the internal mass.

Optionally, the internal mass can also be suspended exclusively by the external connecting means. Such a configuration is shown in FIG. 8 in which same parts are again identified with same reference numerals. Here, the restoring moment is effected by the mass inertia of the internal mass 3.

Figure 9:
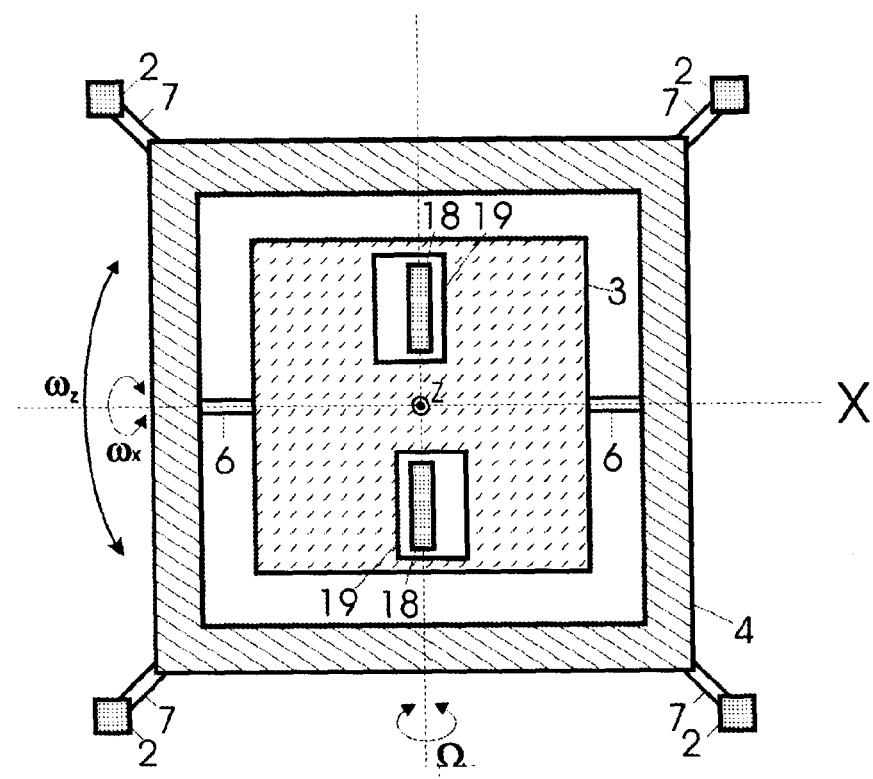
FIG. 9 shows the internal mass not directly attached by an anchor to the substrate.

Another variant is illustrated in FIG. 9 in which the internal mass, as shown in the embodiment of FIG. 8, is not directly attached by an anchor to the substrate. The restoring moment is generated by an electrostatic force in this embodiment. In this embodiment, plate electrodes 18 are inserted. The mass 3 is not mechanically anchored and is connected only by spring elements 6 to the external ring (the drive mass). A restoring force can be generated by applying a voltage between the elements 18 and 19 as well as 3. Beneficially, an alternating voltage at same frequency as that of the drive oscillation and optimized phase position is applied between the structures 8 and 3. Typical voltage magnitudes are in the range of a few millivolts to a few volts. The electrodes can be embodied, as mentioned before, as plate electrodes. However, finger electrode that are widely used in microsystem technology or stepped finger electrodes are also especially suitable. In this connection, the electrodes can be positioned externally but also can be arranged centrally.

Figure 10:
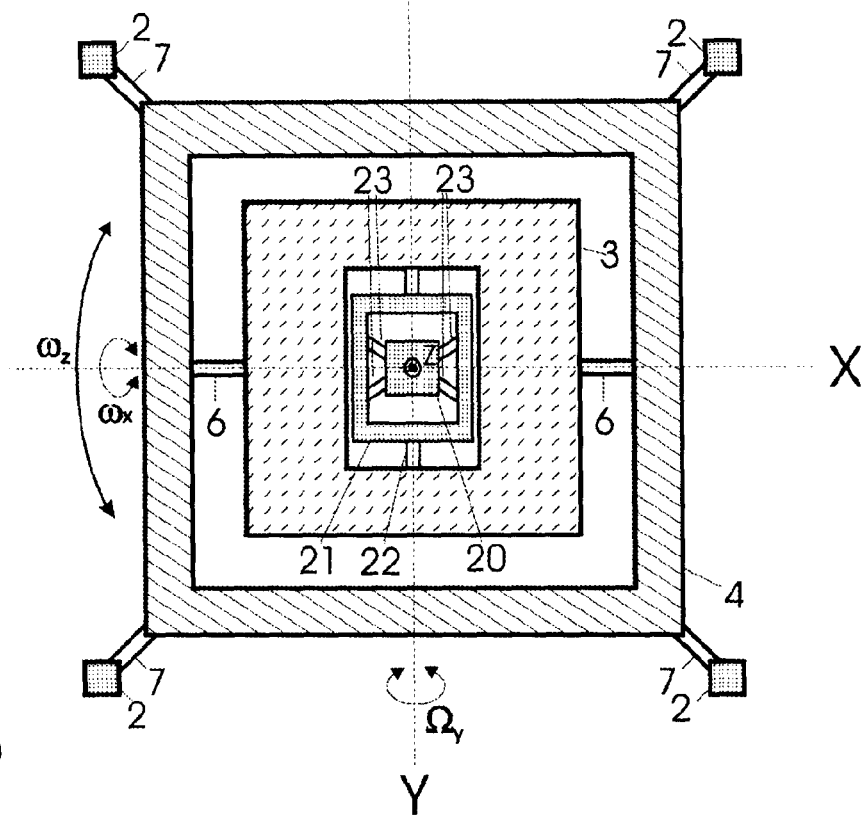
FIG. 10 shows a stress-decoupled anchoring of the sensing element.

Finally, the multitude of possibilities is also demonstrated with the aid of an embodiment as shown in FIG. 10 that shows a stress-decoupled anchoring of the sensing element. In this embodiment the sense mass 3 is not connected to a central anchor but the suspension is designed such that by means of the springs 22 the plate is mounted on an inner fastening ring 21. This fastening ring is in turn attached by means of a stress-decoupled mechanical structure 23 on an anchor. Accordingly, layer stress or thermally caused mechanical stress can be compensated by the structure 23. In addition, the annular structure 21 can be designed such that stress can be additionally compensated. By means of stress decoupling the sensor system as a whole is less sensitive relative to temperature drift or process fluctuations.

The present invention, as mentioned before, can also be used for laterally oscillating rotation rate sensors.

It should thus be understood that the arrangement of the different components of the rotation rate sensor can be selected at will taking into consideration the facts that it comprises a driving and sensing arrangement whose mass elements are located substantially in the X-Y direction flat above the substrate surface and that the drive mass and sense mass are arranged relative to the anchor with mirror symmetry and/or with rotational symmetrical. Mirror symmetry is understood in this context as a mirror symmetry with an X-Z plane or a Y-Z plane as a mirror plane that extends through the anchor, when the latter is arranged centrally, or extends through an imaginary center of the anchoring structure, when the latter is comprised of several partial elements. Rotational symmetry is to be understood in this context as a symmetry about a Z axis that extends through the anchor center, when the anchor is centrally arranged, or extends through the imaginary center of the anchoring structure, when the latter is comprised of several partial elements. The rotational symmetry can have, for example, 2, 3, 4, 5, 6 or 8 symmetry axes, i.e, a rotation about 360° about the Z axis divided by 2, 3, 4. . . leads to the structures being congruent. Alternatively, the rotational symmetry can also be an axial symmetry.

What is claimed is:

1. A rotation rate sensor for sensing a rotation $\Omega$ by which the sensor is rotated, the sensor comprising:
    a substrate;
    a driving and sensing arrangement located substantially flat in an X-Y plane above a substrate surface of the substrate and having a center;
    wherein the driving and sensing arrangement comprises a drive mass and a sense mass that are arranged at different spacings from the center of the driving and sensing arrangement symmetrically about the center;
    wherein oscillation modes of the drive mass and the sense mass are partially transmittable onto one another and are partially decoupled;
    wherein the rotation $\Omega$ is sensed in that a tilting of the sense mass out of a surface plane of the driving and sensing arrangement is sensed;
    wherein a first one of the drive and sense masses that has a greater spacing to the center is tilted under the effect of Coriolis force out of the surface plane;
    wherein said first one of the drive and sense masses is connected by symmetrically arranged external anchors to the substrate such that a restoring action for the tilting action of said first one of the drive and sense masses is assisted by the external anchors.

2. The rotation rate sensor according to claim 1, wherein the drive mass by excitation is caused to perform a translatory oscillation in a Y direction or a rotatory oscillation about a Z axis, and wherein the sense mass is tiltable out of the X-Y plane about a Y axis upon action onto the rotation rate sensor by the rotation $\Omega$ occurring about an X axis.

3. The rotation rate sensor according to claim 1, wherein the drive mass and the sense mass are arranged with mirror-symmetry and/or rotational symmetry about the center and wherein one of the drive and sense masses is arranged, at least with respect to its center of gravity that is located on a radius axis, radially at a greater spacing relative to the anchor than the other one of the drive and sense masses.

4. The rotation rate sensor according to claim 1, wherein the sense mass is positioned at a greater spacing to the center than the drive mass, wherein connecting elements are provided that transmit the oscillation of the drive mass in the X-Y plane onto the sense mass but prevent that the drive mass, upon action of the rotation $\Omega$ onto the sensor, is tilted out of the X-Y plane or reduce the tilting action on the sense mass.

5. The rotation rate sensor according to claim 1, wherein the drive mass is positioned at a greater spacing to the center than the sense mass, wherein connecting elements are provided that allow a tilting action of the drive mass upon action of the rotation $\Omega$ on the sensor but prevent or reduce a transmission of the oscillation of the drive mass in the X-Y plane onto the sense mass.

6. The rotation rate sensor according to claim 1, comprising a means for generating a restoring moment for the first one of the drive mass and the sense mass that is closer to the center.

7. The rotation rate sensor according to claim 6, wherein the means for generating a restoring moment is an electrostatic means.

8. The rotation rate sensor according to claim 7, wherein the means for generating a restoring moment is formed by oppositely charge electrodes that are attached to the substrate and to the first one of the drive mass and the sense mass that is closer to the center.

9. The rotation rate sensor according to claim 1, wherein the first one of the drive mass and the sense mass that is closer to the center is connected by an anchoring structure to the substrate.

10. The rotation rate sensor according to claim 9, wherein the anchoring structure is a centrally arranged anchor or a multi-part anchor whose parts are arranged mirror-symmetrical relative to the Y axis and optionally also to the X axis of the driving and sensing arrangement.

11. The rotation rate sensor according to claim 9, wherein the anchoring structure has an internal fastening ring that is mounted by springs in a recess of the first one of the drive mass and the sense mass that is closer to the center and is attached to the anchoring structure by a stress-decoupled mechanical structure.

12. The rotation rate sensor according to claim 1, wherein the first one of the drive mass and the sense mass has a greater spacing to the anchor, is connected by at least two connecting means to the substrate in such a way that the restoring action for the tilting action out of the X-Y plane is assisted by the connecting means.

13. The rotation rate sensor according to claim 1, wherein the drive mass carries out a rotatory oscillation.

14. The rotation rate sensor according to claim 1, wherein the drive mass is configured as a frame.

15. The rotation rate sensor according to claim 1, wherein the drive mass is comprised of several partial elements that are connected to one another or are not connected to one another.

16. The rotation rate sensor according to claim 1, wherein the sense mass is configured as a frame.

17. The rotation rate sensor according to claim 1, wherein the sense mass is comprised of several partial elements that are connected to one another or are not connected to one another.

18. The rotation rate sensor according to claim 1, comprising connecting elements between the central anchor and the sense mass that are designed such that a rotation of the sense mass in the X-Y plane is substantially prevented.

19. The rotation rate sensor according to claim 18, wherein the connecting elements are springs having a spring constant $k_{\Phi Z}$ in the range of 100 to 5,000×10$^{-6}$ Nm/rad.

20. The rotation rate sensor according to claim 18, wherein the connecting elements are springs having a spring constant $k_{\Phi Z}$ that is higher by at least a factor of 10 than the spring constants $k_{\Phi X}$ and $k_{\Phi Y}$.

21. The rotation rate sensor according to claim 18, wherein the connecting elements are springs having a spring constant $k_{\Phi Z}$ in the range of 100 to 1,000×10$^{-6}$ Nm/rad.

22. The rotation rate sensor according to claim 1, comprising connecting elements between the drive mass and the sense mass and configured such that the oscillation of the drive mass in the X-Y direction is not transmitted, or only partially transmitted, onto the sense mass.

23. The rotation rate sensor according to claim 22, wherein the connecting elements are springs having spring constants $k_{\Phi X}$, $k_{\Phi Y}$ and $k_{\Phi Z}$ that each are in the range of approximately 1 to approximately $1,000 \times 10^{-6}$ Nm/rad.

24. The rotation rate sensor according to claim 22, wherein the connecting elements are springs having spring constants $k_{\Phi X}$, $k_{\Phi Y}$ and $k_{\Phi Z}$ that each are in the range of approximately 5 to approximately $50 \times 10^{-6}$ Nm/rad.

25. The rotation rate sensor according to claim 1, wherein the external anchors are springs having spring constants $k_{\Phi X}$, $k_{\Phi Y}$ and $k_{\Phi Z}$ that each are in the range of approximately 0.1 to approximately $1,000 \times 10^{-6}$ Nm/rad.

26. The rotation rate sensor according to claim 1, wherein the external anchors are springs having spring constants $k_{\Phi X}$, $k_{\Phi Y}$ and $k_{\Phi Z}$ that each are in the range of approximately 0.5 to approximately $10 \times 10^{-6}$ Nm/rad.

\* \* \* \* \*

UNITED STATES PATENT AND TRADEMARK OFFICE
CERTIFICATE OF CORRECTION

PATENT NO.        : 8,215,168 B2
APPLICATION NO.   : 12/594597
DATED             : July 10, 2012
INVENTOR(S)       : Peter Merz et al.

It is certified that error appears in the above-identified patent and that said Letters Patent is hereby corrected as shown below:

In the Specifications

Col. 4, line 19, change "Z axis at frequency $f_x$" to read
--Z axis at frequency $f_z$--.

Col. 5, line 28, change "degrees for the mass 9" to read
--degrees for the mass 8--.

Col. 9, line 48, change "respectively. wherein" to read
--respectively, wherein--.

Signed and Sealed this
Twenty-fifth Day of February, 2014

Michelle K. Lee
*Deputy Director of the United States Patent and Trademark Office*